US010493403B2

(12) United States Patent
Letournel

(10) Patent No.: US 10,493,403 B2
(45) Date of Patent: Dec. 3, 2019

(54) DEVICE FOR TREATING AT LEAST ONE GASEOUS EFFLUENT STREAM AND CORRESPONDING TREATMENT METHOD

(71) Applicant: VIVIRAD (SOCIÉTÉ ANONYME), Handschuheim (FR)

(72) Inventor: Eric Letournel, Ittenheim (FR)

(73) Assignee: VIVIRAD, Handschuheim (FR)

(*) Notice: Subject to any disclaimer, the term of this patent is extended or adjusted under 35 U.S.C. 154(b) by 486 days.

(21) Appl. No.: 14/895,420

(22) PCT Filed: Jun. 5, 2014

(86) PCT No.: PCT/FR2014/051352
§ 371 (c)(1),
(2) Date: Dec. 2, 2015

(87) PCT Pub. No.: WO2014/199053
PCT Pub. Date: Dec. 18, 2014

(65) Prior Publication Data
US 2016/0114288 A1 Apr. 28, 2016

(30) Foreign Application Priority Data
Jun. 10, 2013 (FR) .................... 13 01321

(51) Int. Cl.
B01J 19/08 (2006.01)
B01D 53/60 (2006.01)
(Continued)

(52) U.S. Cl.
CPC ............ B01D 53/60 (2013.01); B01D 53/32 (2013.01); B01D 53/78 (2013.01); B01J 19/085 (2013.01);
(Continued)

(58) Field of Classification Search
None
See application file for complete search history.

(56) References Cited

U.S. PATENT DOCUMENTS 4,752,450 A 6/1988 Dietrich et al.
5,539,212 A 7/1996 Matthews et al.
(Continued)

FOREIGN PATENT DOCUMENTS

CN 1544129 A 11/2004
CN 1600409 A 3/2005
(Continued)

OTHER PUBLICATIONS

International Search Report, dated Sep. 4, 2014, from corresponding PCT Application.

Primary Examiner — Anita Nassiri-Motlagh
(74) Attorney, Agent, or Firm — Young & Thompson

(57) ABSTRACT

A device for treating at least one gaseous stream (14) includes a single reactor (10) that is frusto-conical or cylindro-conical in shape and allows the recovery, by gravity, of the liquid products (26) obtained by treating the at least one gas stream (14) with electron beams (18), and at least: —inlet element (12) for the at least one gas stream (14), disposed at the top of the single reactor (10), —elements (16) for emitting an electron beam (18), the beam being oriented substantially in the direction of flow of the gas stream, —outlet element (20) from the single reactor (10) for the gas products (22) that have undergone the treatment, from the at least one gaseous effluent (14), disposed at the bottom of the reactor, and —elements (24) for recovering liquid sub-products (26). The corresponding treatment method is also described.

20 Claims, 1 Drawing Sheet

(51) Int. Cl.
*B01D 53/32* (2006.01)
*B01D 53/78* (2006.01)
(52) U.S. Cl.
CPC ............... *B01D 2251/2062* (2013.01); *B01D 2259/812* (2013.01); *B01J 2219/0875* (2013.01)

(56) References Cited

U.S. PATENT DOCUMENTS

| | | | | | |
|---|---|---|---|---|---|
| 5,656,047 | A | * | 8/1997 | Odom | B01D 47/06 55/355 |
| 5,695,616 | A | * | 12/1997 | Helfritch | B01D 53/60 204/157.3 |
| 5,834,722 | A | * | 11/1998 | Tokunaga | B01D 53/007 204/157.15 |
| 7,255,842 | B1 | * | 8/2007 | Yeh | B01D 53/60 423/234 |

FOREIGN PATENT DOCUMENTS

| | | |
|---|---|---|
| CN | 2796843 Y | 7/2006 |
| CN | 101745306 A | 6/2010 |
| DE | 36 16 800 A1 | 11/1987 |
| EP | 2 246 117 A1 | 11/2010 |
| JP | H08-504123 A | 5/1996 |
| JP | H08-164324 A | 6/1996 |
| JP | 2006-167500 A | 6/2006 |
| JP | 2011-218293 A | 11/2011 |
| WO | 96/24805 A1 | 8/1996 |
| WO | 2010/141306 A1 | 12/2010 |

\* cited by examiner

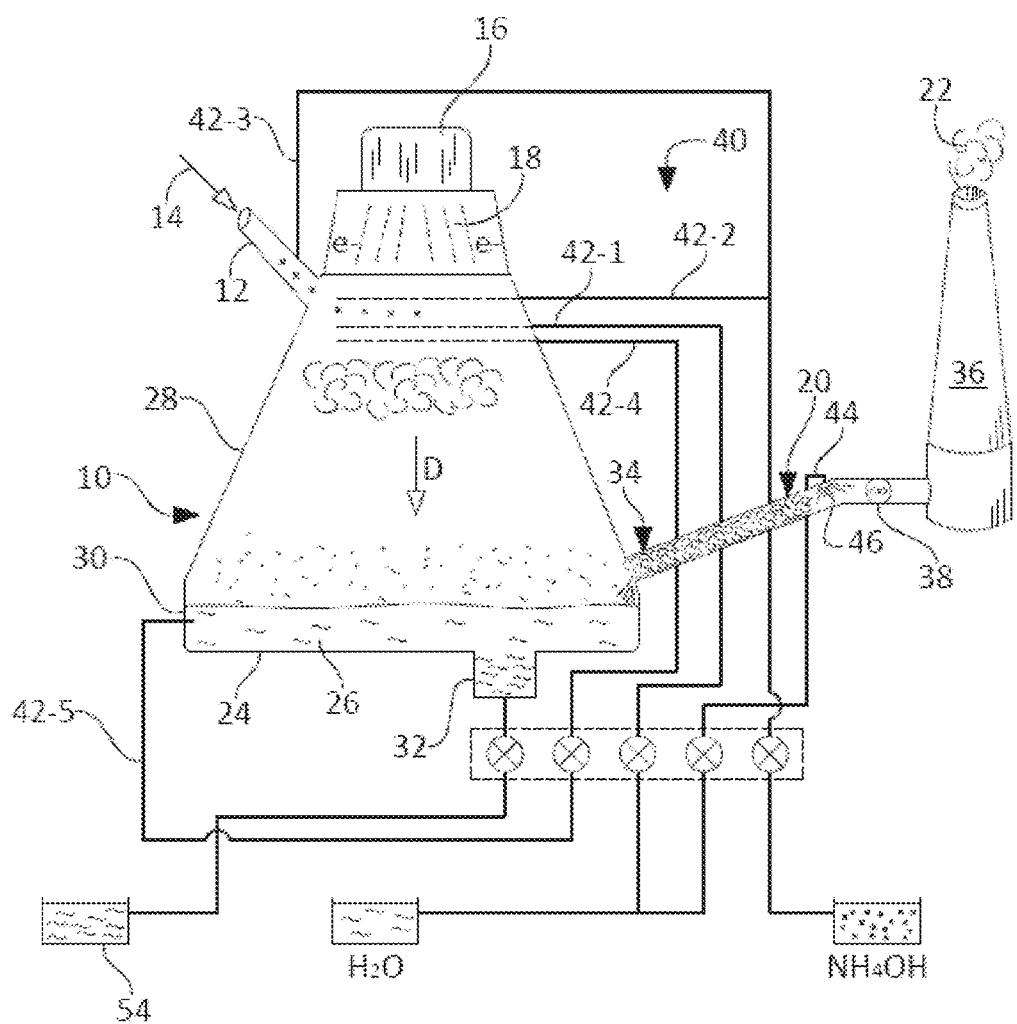

DEVICE FOR TREATING AT LEAST ONE GASEOUS EFFLUENT STREAM AND CORRESPONDING TREATMENT METHOD

BACKGROUND OF THE INVENTION

Field of the Invention

This invention relates to a device for treating at least one gaseous stream, more particularly a stream of polluted gaseous effluents, for the purpose of clean-up.

Description of the Related Art

It is known that numerous gaseous effluents are polluted. So as to clean them up, there are prior art solutions that consist in treating these effluents in a line comprising multiple reactors, each having a function.

A known treatment consists in subjecting the gaseous stream to a high-energy electron bombardment in one of the reactors of the line.

If the gases are combined with suitable reagents, the electron bombardment ensures an ionization and an excitation of molecules contained in the gaseous effluent, in particular polluting molecules. The reagents that are present and the free radicals created by the electron bombardment will react with the polluting compounds of the gaseous effluent to provide non-polluting products, on the one hand, in the form of precipitates and gaseous products from which polluting products are removed.

Thus, ammonium sulfates and ammonium nitrates are obtained from gases containing sulfur oxides and nitrogen oxides. Such gases are obtained from refineries, from the heavy oil industry, from incinerators or from steelworks.

The known treatment lines thus comprise multiple reactors for introducing reagents, for subjecting them to an electronic bombardment, and for recovering the products.

It is possible to refer to the patent application WO 2010/141306 that discloses arrangements of this type.

Under these arrangements, it is indeed a line of multiple reactors. It is also noted that the bombardment is perpendicular to the direction of circulation of the gaseous stream. However, it is known that the electrons quickly lose energy during collisions with the gaseous molecules of the gaseous stream.

The electrons therefore have very high energy in the upper layer and lower energy in the lower layer of the stream.

Thus, the bombardment is not homogeneous.

The only solution is to diffuse these electrons in a sufficient quantity and energy so that they treat the lower layer in a suitable way, but then there is a useless intense dose of power in the top part and a loss of energy at the bottom of the reactor, which always entails a cost.

There are also needs of the same type for different applications, in particular in the production of polymers. In the course of these methods, a bombardment of electrons can bring about the generation of free radicals and/or activate the monomers to make them more reactive and to ensure a polymerization that is more complete, faster, or to make grafting possible in the presence of catalysts.

BRIEF SUMMARY OF THE INVENTION

The purpose of this invention is to make possible an effective gas treatment in a single reactor by subjecting the gases to a bombardment by an electron beam.

For this purpose, the device for treating at least one gaseous stream, in particular a stream of polluted gaseous effluents is proposed.

As for the method for treating at least one gaseous stream according to the invention, it comprises at least the following stages:
  Introducing at least one gaseous stream,
  Introducing at least one reagent,
  Subjecting the gaseous stream and the at least one reagent to an electron beam,
  Separating, on the one hand, the product or the products obtained from treating the at least one gaseous stream by electron beams, and, on the other hand, the treated gaseous products; this occurs within a single reactor according to the invention.

BRIEF DESCRIPTION OF THE DRAWINGS

The device and the method are now described in detail according to a particular embodiment, relative to the accompanying drawing, a drawing in which the single FIGURE shows a diagrammatic view (with primarily a cutaway according to a view with lateral elevation) of the device making possible the implementation of the method according to this invention.

DETAILED DESCRIPTION OF THE PREFERRED EMBODIMENTS

The device that is now described relates to a reactor that is more particularly suited to treating a stream of polluted gaseous effluents but would find use for other applications in which it is necessary to activate free radicals of gaseous chemical compounds, as in the chemistry of polymers, in the presence of catalysts, for example.

The device according to this invention comprises a single reactor 10, inlet means 12 of at least one gaseous stream 14 in the single reactor, emission means 16 of an electron beam 18 in said reactor, and outlet means 20 of the single reactor of gaseous products 22 having undergone the electron beam treatment.

The single reactor also comprises means 24 for recovery of liquid by-products 26, which means are arranged in the lower part of said single reactor.

It is noted that in the arrangement as shown diagrammatically in the single FIGURE, the inlet means 12 of the at least one gaseous stream are arranged at the top of the single reactor 10 and in that the outlet means 20 of the gaseous products are arranged at the bottom of said single reactor 10.

The single reactor is a chamber 28 that is advantageously tapered, and even cylindrical-conical, in shape.

This geometry has the advantage of generating a temperature gradient from the top to the bottom of the reactor so as to optimize the effectiveness of treating the pollutants contained in the gaseous effluent. For example, the elimination yields of nitrogen oxides by electron beam are enhanced by high gaseous effluent temperatures (for example, for temperatures of greater than 100° C.) whereas the better elimination yields of the sulfur oxides are obtained for lower temperatures (for example, for temperatures of less than 60° C.).

In the preferred embodiment, the at least one gaseous stream 14 is introduced via the inlet means 12, and the circulation is carried out toward the outlet means 20, thus defining a direction D of circulation, symbolized by an arrow. In this case, this direction is, even more advantageously, oriented vertically.

The inlet means 12 consist of at least one tapping of the top part, laterally, but inclined toward the single reactor 10 in such a way that the optional liquids that form in these inlet means 12 flow under the action of gravity into said single reactor 10.

The emission means 16 of an electron beam 18 in said reactor 10 are arranged in the top part of this reactor. The emitted electron beam 18 is oriented in a particular and sensitive way for this invention since the beam 18 is to be oriented in the direction of circulation of the at least one gaseous stream, i.e., in the direction D of circulation; this occurs with a tolerance of ±30°, to obtain a high yield.

The power of the beam 18 is adapted according to the nature of the gaseous stream that is to be treated, on the one hand, and according to the reactivity of the molecules that are introduced into the single reactor 10, on the other hand.

The geometry of the electron beam 18 is adapted to the geometry of the top of the reactor in such a way as to cover the section of the top of the reactor; this occurs in a uniform and homogeneous way.

In the lower part, the means 24 for recovery of the liquid by-products 26 consist of the lower part of the single reactor 10 itself, of a tapered shape. Advantageously, the foot 30 of the reactor is thus cylindrical in shape, in the extension of the upper conical shape.

The single reactor 10 can also comprise a collecting well 32, made in its base, in such a way as to create a low collecting point within the liquid bath itself that is formed at the foot of the reactor.

The outlet means 20 of the gaseous products, means that are arranged at the bottom of said single reactor 10, comprise a tapping 34 that is generally directed either toward a recycling system or toward a shaft 36 with exposure to open air, for the application to treating polluted gaseous effluents. Circulation means 38, for example in the form of fans, are inserted in such a way as to make the gaseous products 22 circulate.

It is noted that the tapping 34 is oriented upward in such a way that the optional liquids entrained by the gaseous products or formed by, for example, condensation, flow by gravity toward the interior of the single reactor 10.

The single reactor 10 is also equipped with means 40 for introducing reagents making possible the introduction of these reagents in said reactor 10. These introduction means 40 can take the shape of at least one tapping 42.

In the embodiment presented, applied to treating a stream of polluted gaseous effluents, at least the following tappings are provided:

A tapping 42-1 for injection of water,
A first tapping 42-2 for injection of ammonia,
A second tapping 42-3 of ammonia, and
A tapping 42-4 for recycling liquid effluents.

In the case of tappings, based on needs, the tappings can be present inside the single reactor 10 in the form of diffusion rings with nozzles, for example in such a way as to distribute the fluids and optionally to micronize them so as to make possible a greater effectiveness of the electron bombardment as is described below.

The device is completed by means 44 for washing the gaseous products.

These means 44 can consist of nozzles 46 for spraying water, means that are arranged at the outlet of the gaseous stream.

It is advantageously possible to provide "curtains" for washing the gaseous effluent by spraying/liquid spray at the reactor outlet.

In an advantageous way, means 48 for pumping a first fraction of liquid by-products 26, highly concentrated in salts, are also associated with the single reactor 10 and more particularly with the collecting well 32.

For the recycling of the second fraction of liquid by-products 26, through the tapping 42-4 dedicated for this purpose, there are provided means 50 for pumping with a sampling tapping 42-5 located in the top part of the bath of by-products 26 at the bottom of the reactor.

In a general way, the device comprises an automatic guidance system, symbolized by the housing including pumps, flow sensors, pressure sensors, temperature sensors and computer means associated with all of the elements that are necessary for guiding and controlling the reactions within the reactor, the reaction temperatures, the dwell time of the gaseous streams before and during treatment. This instrumentation is known and is not shown in detail, because it is perfectly within the scope of one skilled in the art and the components are available in trade or accessible.

The device also comprises a reservoir 54 for storing liquid products that are highly concentrated in salts.

The method that is used with the device is now described.

This method consists of at least the series of the following stages:

Introducing at least one gaseous stream 14,
Introducing at least one reagent, in particular the ammonia $NH_4OH$, in the case of a method whose purpose is treating at least one gaseous stream 14 of the polluted gaseous effluent type,
Subjecting the at least one gaseous stream and the at least one reagent to an electron beam,
Separating the liquid product or products obtained from treating a gaseous stream by electron beams, and, in contrast, the treated gaseous products, this occurs within a single reactor 10.

According to the detailed example of application in this invention, the method provides—in the case of treating at least one gaseous stream 14 that consists of polluted gaseous effluents—a treatment by injection of water and ammonia. The ammonia could also be injected in gaseous form.

Thus, the gaseous stream 14, if only one such stream is introduced, passes through via the introduction means 12. These introduction means 12 are arranged in a lateral way so as not to disrupt the electron beam 18 emitted by the emission means 16 of this beam, but based on the structure, these means could be directed in a central way, in the direction D of circulation of the gaseous stream within the single reactor 10.

The method provides an emission of this electron beam 18 in a direction D, which is that of the circulation of the stream in the single reactor 10, this with a range of incidences between the emission direction of the electron beam 18 and the direction D of circulation of the stream in the single reactor of between ±30°.

The objective is to direct the electron beam 18 essentially parallel to the direction D of circulation of the gaseous stream in the single reactor 10.

Actually, the more the beam 18 is parallel to the direction D of the gaseous stream 14 in the reactor 10 the more significant the effectiveness of said beam 18 will be. The emitted electrons have a maximum power upon contact with the incoming gaseous stream 14; this occurs in a homogeneous way.

In addition, the electrons continue their travel in the direction of the stream; they therefore have the tendency to strike the molecules of the gaseous stream 14 and reagents over the entire height of the gaseous stream 14 contained in the reactor 10 before striking a wall of the reactor and therefore before undergoing the corresponding damping.

It is also noted that in the arrangement shown, the electrons that would not have been absorbed by the gaseous molecules act on the surface of the bath of the liquid products 26 at the bottom of the single reactor 10, continuing the optional reactions on the different molecules.

Thus, according to an enhancement of the method according to this invention, the collected liquid products 26 are reinjected, on the one hand, at the top of the gaseous stream 14 close to the introducing means so as to make them undergo a new bombardment of electrons.

The pH of the bath is monitored, as well as all of the temperature gradient parameters in the reactor.

In the case of treating smoke, soot, flyash and other materials in suspension are eliminated.

The subjecting of the mixture of gaseous effluents $SO_x$ and $NO_x$ and reagents to the electron beam 18 induces the formation of radicals that break down the volatile organic compounds and the dioxins and convert the sulfur oxides and nitrogen oxides into a mixture of sulfate salts and ammonium nitrate.

For the collected liquid products 26, a decanting occurs, and the products that are concentrated in salts are found in the bottom part of the bath and are removed from the single reactor 10 in such a way as to preserve a given bath level and to eliminate the recombined and non-polluting products.

These products are stored for the purpose of another use or any other separation treatment.

The stream of gaseous products having undergone the electron bombardment and still in gaseous form is evacuated into the atmosphere in the case shown.

So as to ensure a very satisfactory clean-up, the gaseous stream undergoes, for example, a spray-water washing, with the washing effluents being redirected toward the reactor owing to the slope of the tapping.

These liquid effluents are themselves also treated in the single reactor 10 until the ultimate liquid effluent form is reached.

In an enhanced way, it is also possible to provide a washing of the walls of the single reactor 10 in such a way as to limit the corrosion of the walls of said reactor. Simultaneously, this washing greatly limits the fouling of the walls by deposits.

Such a method can be carried out on a large scale for treating volumes of several hundred thousand normal $m^3/h$.

The arrangement is particularly advantageous in industrial terms with a strong enhancement of the energy yield and a large increase in the effectiveness of the treatments.

In addition, it is noted that the incoming molecules of the gaseous stream 14 are treated with electrons of the same power, in a homogeneous manner.

This arrangement of a single reactor 10 can also be suitable for enhancing the effectiveness and the conversion yield in the field of chemistry and polymers, in particular when it is necessary to activate compounds or to generate free radicals.

In particular, it makes possible the synthesis of one or more products obtained from the treatment by electron beam 18 in the reactor of one or more compounds in the gaseous state with or without the addition of one or more liquid, solid or powdered reagents.

Advantageously, the injection of the reagents within the single reactor 10 is done in spray form so as to create a "fog," enhancing the contact surface between the gas and the liquid.

The single reactor 10 for treating effluents or gaseous stream 14 in the wet phase according to the invention therefore makes possible:

The capture of compounds contained in the effluent or gaseous stream 14 and their management in the liquid phase, The injection of all types of reagents in liquid form or powdered form (ammoniacal solution, powdered lime or water, for example) in the reactor 10, The recovery of all of the by-products of aqueous treatment and/or solids in a tank located in the bottom position of the reactor 10, The reinjection of the solution recovered in the tank in the bottom position of the reactor 10 toward the top portion of the reactor 10. The recirculation of the solution of the tank makes it possible to increase the concentrations of by-products for treating this solution and thus to optimize/limit the inputs of reagents, The significant formation of active entities (oxidizing and reducing radicals) obtained from the reaction for radiolysis of waste water caused by the interaction of accelerated electrons with water molecules. These active entities are at the origin of the effectiveness of treating gases by the VGS method because they will induce the degradation of organic molecules (dioxins, polychlorobiphenyls, volatile organic compounds . . . ), the oxidation of sulfur oxides or nitrogen oxides, the reduction of metals contained in the gaseous effluent. This optimization of the production of active entities by supersaturation of the moisture level in the single reactor 10 is particularly advantageous and makes it possible to obtain better performance levels of treatment than those obtained with so-called "dry" or "semi-wet" methods, The permanent washing of walls and nozzles in the reactor 10 so as to prevent their fouling and their corrosion. This washing also makes it possible to recover the ashes, soot, and other fine particles contained in the effluent or gaseous stream 14.

According to another characteristic, the method according to the invention is therefore also characterized in that the production of active entities obtained from the radiolysis of waste water that is used as at least one liquid reagent is done with supersaturation of the moisture level in the single reactor 10.

The invention claimed is:

1. A method for treating at least one polluted gaseous stream including volatile organic compounds, dioxins, sulfur oxides, and nitrogen oxides in a single reactor that has a tapered or cylindrical-conical shape including at least one inlet configured to provide the at least one polluted gaseous stream in the single reactor, arranged at the top of the single reactor, a supply system separate from the inlet configured to supply at least one liquid reagent, an emission system configured to emit at least one electron beam in said reactor, the electron beam being oriented essentially downwardly from the top of the single reactor adjacent the inlet into the single reactor, an outlet of the single reactor disposed at the lower part of the single reactor and configured to output gaseous products resulting from an electron beam treatment of the at least one polluted gaseous stream, and a recovery system configured to recover liquid by-products disposed in the lower part of said single reactor, the method comprising:

introducing the at least one polluted gaseous stream into the single reactor via the inlet;

introducing at least one liquid reagent in the form of ammonia and water into the polluted gaseous stream from the supply system to obtain a mixture of the polluted gaseous stream and the liquid reagent, the at least one liquid reagent being provided into the single reactor separately from the polluted gaseous stream;

subjecting the mixture of the polluted gaseous stream and the liquid reagent to the at least one electron beam directed downwardly into the tapered or cylindrical-conical shaped single reactor to induce the formation of radicals from the water that break down the volatile organic compounds and the dioxins, and convert the sulfur oxides and the nitrogen oxides into a mixture of sulfate salts and ammonium nitrate;

separating at least one liquid product obtained from treating the at least one polluted gaseous stream, and treated gaseous products at the single reactor at the lower part of the single reactor;

evacuating said gaseous products from the single reactor from the outlet disposed at the lower part of the single reactor; and collecting and recovering, due to the tapered or cylindrical-conical shape of the single reactor and by gravity, the at least one liquid product at the bottom of the single reactor that is obtained by the treatment by electron beams of the at least one polluted gaseous stream.

2. The method for treating at least one gaseous stream according to claim 1, wherein the electron beam is emitted downwardly in a direction of circulation of the gaseous stream in the single reactor.

3. The method for treating at least one gaseous stream according to claim 1, wherein the reagent that is subjected to the electron beam results in radiolysis of the reagent, and active entities are obtained from the radiolysis of the reagent by supersaturation of the moisture level in the single reactor.

4. The method for treating at least one gaseous stream according to claim 1, wherein the at least one reagent is injected within the single reactor by spraying to create a fog to enhance a contact surface between the gas and the liquid.

5. The method for treating at least one gaseous stream according to claim 1, wherein the inlet for the at least one polluted gaseous stream and the outlet for the gaseous products are disposed to define a direction of vertical circulation with a tolerance of ±30° in the single reactor.

6. The method for treating at least one gaseous stream according to claim 1, further comprising performing washing with a washing system of the gaseous products having undergone the electron beam treatment.

7. The method for treating at least one gaseous stream according to claim 1, wherein the liquid by-products obtained by the electron beam treatment of the polluted gaseous stream are recovered in a liquid bath that is provided in the single reactor.

8. The method for treating at least one gaseous stream according to claim 1, wherein the liquid by-products obtained by the electron beam treatment of the polluted gaseous stream are recovered by a recovery system configured to recover the liquid products, and/or wherein said liquid products are reinjected into the single reactor through a reinjection system.

9. The method for treating at least one gaseous stream according to claim 2, wherein the reagent that is subjected to the electron beam results in radiolysis of the reagent, and active entities are obtained from the radiolysis of the reagent by supersaturation of the moisture level in the single reactor.

10. The method for treating at least one gaseous stream according to claim 2, wherein the at least one reagent is injected within the single reactor by spraying to create a fog to enhance a contact surface between the gas and the liquid.

11. The method for treating at least one gaseous stream according to claim 2, wherein the inlet for the at least one polluted gaseous stream and the outlet for the gaseous products are disposed to define a direction of vertical circulation with a tolerance of ±30° in the single reactor.

12. The method for treating at least one gaseous stream according to claim 2, further comprising performing washing with a washing system of the gaseous products having undergone the electron beam treatment.

13. The method for treating at least one gaseous stream according to claim 2, wherein the liquid by-products obtained by the electron beam treatment of the polluted gaseous stream are recovered in a liquid bath that is provided in the single reactor.

14. The method for treating at least one gaseous stream according to claim 2, wherein the liquid by-products obtained by the electron beam treatment of the polluted gaseous stream are recovered by a recovery system configured to recover the liquid products, and/or wherein said liquid products are reinjected into the single reactor through a reinjection system.

15. The method for treating at least one gaseous stream according to claim 3, wherein the at least one reagent is injected within the single reactor by spraying to create a fog to enhance a contact surface between the gas and the liquid.

16. The method for treating at least one gaseous stream according to claim 3, wherein the inlet for the at least one polluted gaseous stream and the outlet for the gaseous products are disposed to define a direction of vertical circulation with a tolerance of ±30° in the single reactor.

17. The method for treating at least one gaseous stream according to claim 3, wherein the liquid by-products obtained by the electron beam treatment of the polluted gaseous stream are recovered in a liquid bath that is provided in the single reactor.

18. The method for treating at least one gaseous stream according to claim 1, wherein the introducing the at least one polluted gaseous stream into the single reactor via the inlet comprises introducing the polluted gaseous stream from a side of the reactor to beneath the emission system, the inlet being inclined downwardly from the top toward the lower part of the reactor.

19. The method for treating at least one gaseous stream according to claim 1, wherein the evacuating said gaseous products from the single reactor comprising evacuating the gaseous products through the outlet that is oriented upwardly from the lower part of the reactor in an upward direction in relation to the top of the reactor such that liquids entrained by the gaseous products or formed by condensation flow by gravity toward the interior of the single reactor.

20. The method for treating at least one gaseous stream according to claim 1, wherein the at least one gaseous stream has a vertical direction of circulation from the top of the reactor to the bottom of the reactor, and the electron beam is directed downwardly into the reactor in the direction of circulation of the gaseous stream.

* * * * *